Dec. 22, 1970     W. H. McKAY     3,548,591
SMOG CONTROL DEVICE
Filed Sept. 11, 1968
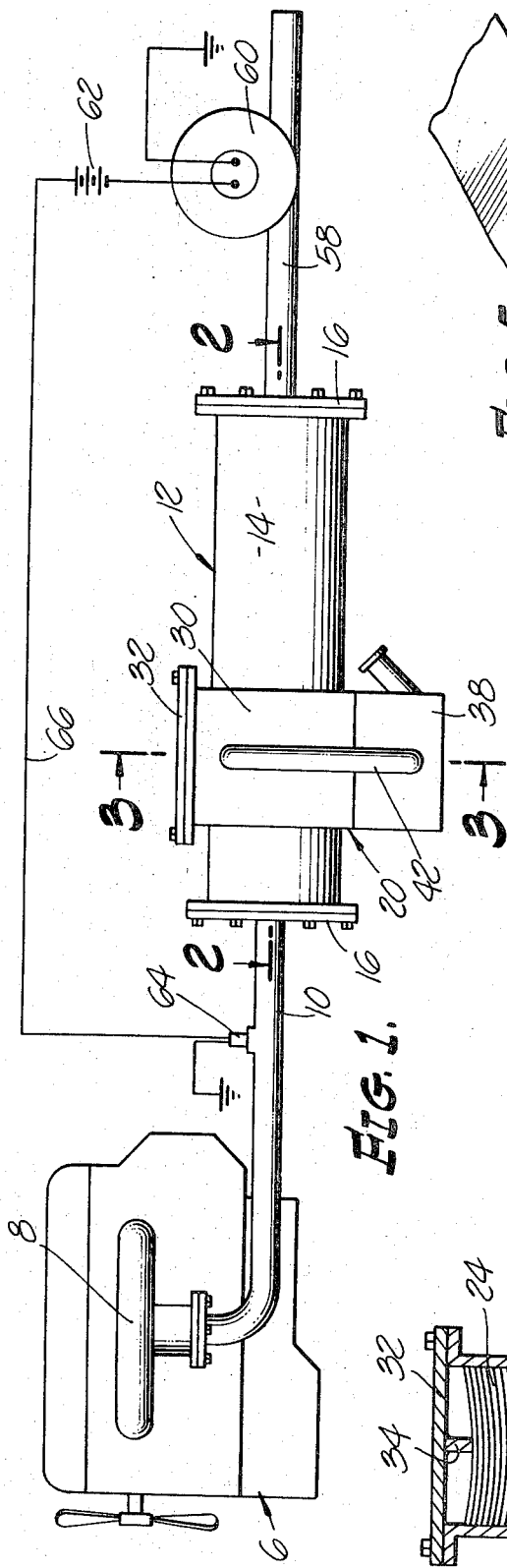
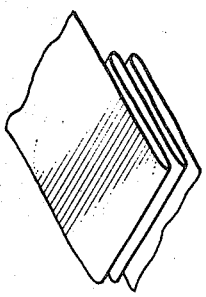
Fig. 5.
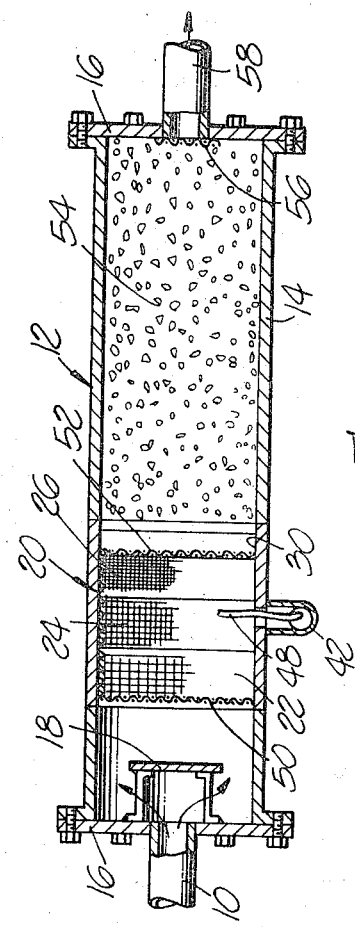
Fig. 2.
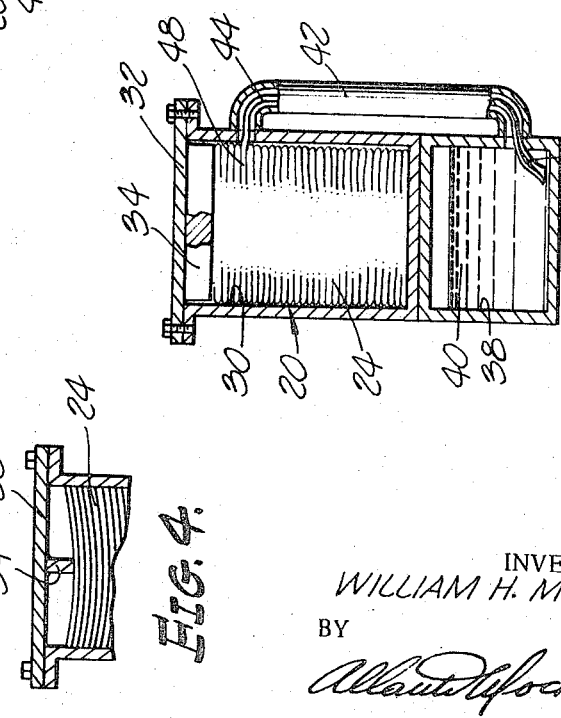
INVENTOR
WILLIAM H. McKAY
BY
Albert H. Huckabee
ATTORNEY

United States Patent Office 3,548,591
Patented Dec. 22, 1970

3,548,591
SMOG CONTROL DEVICE
William H. McKay, 3401 Larga Ave.,
Los Angeles, Calif. 90039
Filed Sept. 11, 1968, Ser. No. 759,086
Int. Cl. F01n 3/00; B01d 50/00
U.S. Cl. 60—32                                  2 Claims

ABSTRACT OF THE DISCLOSURE

An internal combustion engine exhaust purifier or smog device characterized by an elongated housing in the engine exhaust line, the housing containing a washing filter of fibrous material in the form of manifolded stacked strips of fibrous material, woven or felted, the material nearer the inlet end of the housing being looser or of greater permeability than that less near the inlet of the housing. Means for maintaining the fibrous filter washing material in a moist condition, a finely divided charcoal filter medium in the housing, a fan or pump for driving exhaust gases through the housing and filter media to prevent back pressure of exhaust gases in the engine, and a pressure responsive pump control in the exhaust line of the engine ahead of the filter housing.

---

This invention relates to an internal combustion engine exhaust washer or smog control device, as such things are commonly designated.

Much of the irritating components of internal combustion engine exhaust gases comprise tiny droplets or vaporized unburned constituents of the engine fuel which in themselves are irritating and injurious to the health, or which when they issue into the sunlight, are converted by photochemical processes into injurious substances.

It is a general object of the present invention to provide means for treating the exhaust gases of internal combustion engines to remove at least a large percentage of the unburned injurious compounds from the exhaust gases before they are released to the atmosphere. In so doing, I contemplate the use of a washer-filter which will collect larger particles and droplets and a second stage filter, preferably of charcoal particles, which will further purify the gases before they issue from the engine exhaust pipe.

Another object is to provide a specific type of fibrous material which in itself is highly efficient but which also can be maintained in a moistened condition to wash the gases and also to increase its ability to catch and retain harmful substances from the internal combustion engine exhaust gases.

Still a further object is to provide a pump device for increasing the flow of gases through the apparatus so that the washer and filter will not retard the normal flow of engine exhaust gases and cause back pressures in the engine.

The above and other objects and advantages of the invention will more fully appear from the following description in connection with the accompanying drawing.

FIG. 1 is a side elevational view of an internal combustion engine and an embodiment of my invention incorporated in the exhaust line, the several parts being shown out of proportion for purposes of clarity of illustration;

FIG. 2 is an enlarged sectional view taken approximately on the line 2—2 of FIG. 1;

FIG. 3 is an enlarged sectional view taken approximately on the line 3—3 of FIG. 1;

FIG. 4 is an enlarged sectional view taken at right angles to that of FIG. 3;

FIG. 5 is an enlarged detail in perspective of a portion of one of the fibrous filter strips.

There is shown an internal combustion engine 6 having a conventional exhaust manifold 8 and an exhaust conduit 10 leading therefrom. Connected in the exhaust pipe 10 is a housing 12 comprising a main tubular portion 14 and removable end caps 16. Exhaust pipe 10 enters the housing 12 through the left end cap 16 as shown in FIG. 2, and the exhaust gases are spread by a suitable baffle 18 so that they will not tend to follow a single confined line of flow with respect to the interior of the housing 12. In the left or inlet portion of the housing 12 is a washer-filter unit, indicated generally at 20. It comprises three stacks 22, 24 and 26 of fibrous material which may be woven or felted. However, it is preferred that the fibrous material be woven, that of the stack 22 being of open mesh providing quite ready permeability by the flowing exhaust gases. The stack 24 is of greater density provided by closer mesh, and the stack 26 being even more closely woven than that of stack 24.

In FIG. 4 there is shown a portion of a stack 28 of fibrous material representing the manner in which the material is stacked or manifolded in the stacks just referred to.

The stacks 22, 24 and 26 are located in a chamber 30 which forms part of the housing 12 but is preferably rectangular in transverse section; whereas, the main portion 14 of the elongated housing may be cylindrical. The chamber 30 is provided with a removable top 32. A pressure element 34 is welded to the underside of the top 32 to exert a predetermined pressure on the tops of the stacks 22, 24 and 26 of fibrous material. This permits the stacks of material to be placed under a desired degree of pressure so that they will be compacted to a degree which will permit reasonable flow of the exhaust gases through them and still provide proper filtering action.

To wash and cleanse the gases flowing through the fibrous filter stacks 22, 24 and 26, the chamber 30 has a reservoir 38 mounted on the underside thereof to contain a quantity of water 40. A tube 42 connects the reservoir 38 and an upper portion of the fibrous filter chamber 30. A wick 44 has its lower end 46 located in the water reservoir 38 and its upper end 48 preferably terminating between the folds of the center stack 24 of fibrous material. Thus, the three stacks of material can be kept quite damp by the wick 46 not only to increase their filtering efficiency, but to actually wash the gases. The inlet and outlet sides of the stacks 24 through 26 are defined by screens 50 and 52 which assist in retaining the stacks in position yet permit exhaust gases to flow through readily.

Approximately the rear half of the housing 12 has particles 54 of carbon filling it to remove carbon monoxide or other injurious gases. If desired, the carbon can be pressed into a cylindrical porous cake so that it will remain in position in the housing, or if in loose finely divided form, it can merely fill the rear half of the housing 12 between the screen 52 and an outlet screen 56 at the end of an exhaust outlet pipe 58.

Connected in the pipe 58 is a pump or exhaust fan 60 which may be run from the vehicle battery 62. The object of the fan 60 is to pull air and gases through the housing 12 so that engine exhaust gases will not create a back pressure in the internal combustion engine 6. Preferably in the engine exhaust pipe 10, I mount a pressure responsive switch 64 of any suitable construction connected by a wire 66 through the battery 62 to the pump or fan so that the pump will be actuated only when exhaust gas pressures in the pipe section 10 increase to a predetermined point. Thus, it is necessary to operate the fan 60 only when such increased pressure conditions occur, such as when the filtering media approach the point of saturation with particles from the exhaust gases which will cause the flow through the filter to become more restricted. At such point it is desirable to replace the filters or some of them so that the filtering efficiency will be maintained and back pressure will not build up to an undesired degree.

From the foregoing it will be understood that various changes can be made in the form, details, arrangement and proportions of the various parts without departing from the spirit of the invention.

I claim:

1. An internal combustion engine exhaust cleaner for use in the exhaust line of the engine, and including a housing having an inlet and an outlet, the inlet being adapted for connection to the exhaust line to receive exhaust gases therefrom, wherein the improvement comprises: a gas cleaner of air permeable fibrous material in said housing across the path of flow of gases from the inlet to the outlet, a gas cleaner of a quantity of charcoal granules transversely filling a portion of said housing between said first mentioned cleaner of fibrous material and said outlet, and a pump flow connected to said housing for increasing the flow of gases therethrough, and a pressure responsive pump control device in the engine exhaust line and connected to said pump to control operation of the pump in response to pressure condition in said exhaust line.

2. An internal combustion engine exhaust cleaner for use in the exhaust line of the engine, and including a housing having an inlet and an outlet, the inlet being adapted for connection to the exhaust line to receive exhaust gases therefrom, wherein the improvement comprises: a gas cleaner of air permeable fibrous material in said housing across the path of flow of gases from the inlet to the outlet, a gas cleaner of a quantity of charcoal granules transversely filling a portion of said housing between said first mentioned cleaner of fibrous material and said outlet, said fibrous material filter comprising an elongated fibrous strip folded upon itself to provide a stack of material whose folds extend across the interior of said housing, and means carried by said housing and pressing upon said stack of fibrous material and being adjustable to produce a fixed pressure on said stack.

References Cited

UNITED STATES PATENTS

| | | | |
|---|---|---|---|
| 366,568 | 7/1887 | Christopher | 55—233 |
| 758,402 | 4/1904 | Yackel | 60—30 |
| 1,773,053 | 8/1930 | McDermet | 60—30 |
| 1,883,715 | 10/1932 | Greene | 55—485 |
| 2,008,800 | 7/1935 | Somers | 55—233 |
| 2,825,424 | 3/1958 | Gross | 55—316 |
| 3,224,171 | 12/1965 | Bowman | 55—467 |
| 3,406,501 | 10/1968 | Watkins | 60—29 |

FOREIGN PATENTS

| | | | |
|---|---|---|---|
| 808,806 | 2/1959 | Great Britain | 60—29 |

DOUGLAS HART, Primary Examiner

U.S. Cl. X.R.

55—233, 467, 485; 60—29